US011822954B2

(12) United States Patent
Kothari et al.

(10) Patent No.: US 11,822,954 B2
(45) Date of Patent: *Nov. 21, 2023

(54) METHODS AND SYSTEMS FOR AUTOMATING DEPLOYMENT OF APPLICATIONS IN A MULTI-TENANT DATABASE ENVIRONMENT

(71) Applicant: Salesforce, Inc., San Francsico, CA (US)

(72) Inventors: Pallav Kothari, San Francisco, CA (US); Phillip Oliver Metting van Rijn, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 17/160,257

(22) Filed: Jan. 27, 2021

(65) Prior Publication Data

US 2021/0182095 A1 Jun. 17, 2021

Related U.S. Application Data

(62) Division of application No. 16/681,017, filed on Nov. 12, 2019, now Pat. No. 11,494,223, which is a division of application No. 15/365,772, filed on Nov. 30, 2016, now Pat. No. 10,474,492, which is a division of application No. 14/793,271, filed on Jul. 7, 2015, now Pat. No. 9,524,185.

(51) Int. Cl.
*G06F 9/46* (2006.01)
*G06F 8/60* (2018.01)
*G06F 9/54* (2006.01)
*G06F 9/50* (2006.01)

(52) U.S. Cl.
CPC ............... *G06F 9/465* (2013.01); *G06F 8/60* (2013.01); *G06F 9/5016* (2013.01); *G06F 9/54* (2013.01)

(58) Field of Classification Search
None
See application file for complete search history.

(56) References Cited

U.S. PATENT DOCUMENTS 7,107,592 B2 * 9/2006 Taylor ................. G06F 9/44521
718/104
9,547,564 B1 * 1/2017 Troutman ........... G06F 11/1469
(Continued)

*Primary Examiner* — Eric C Wai
(74) *Attorney, Agent, or Firm* — Polygon IP, LLP

(57) ABSTRACT

In accordance with embodiments disclosed herein, there are provided mechanisms and methods for automating deployment of applications in a multi-tenant database environment. For example, in one embodiment, mechanisms include managing a plurality of machines operating as a machine farm within a datacenter by executing an agent provisioning script at a control hub, instructing the plurality of machines to download and instantiate a lightweight agent; pushing a plurality of URL (Uniform Resource Locator) references from the control hub to the instantiated lightweight agent on each of the plurality of machines specifying one or more applications to be provisioned and one or more dependencies for each of the applications; and loading, via the lightweight agent at each of the plurality of machines, the one or more applications and the one or more dependencies for each of the one or more applications into memory of each respective machine.

20 Claims, 7 Drawing Sheets

(56) References Cited

U.S. PATENT DOCUMENTS

2005/0166180 A1* 7/2005 Lemon ................... G06F 8/34
  717/109
2018/0113684 A1* 4/2018 Dawson ................... G06F 8/36

* cited by examiner

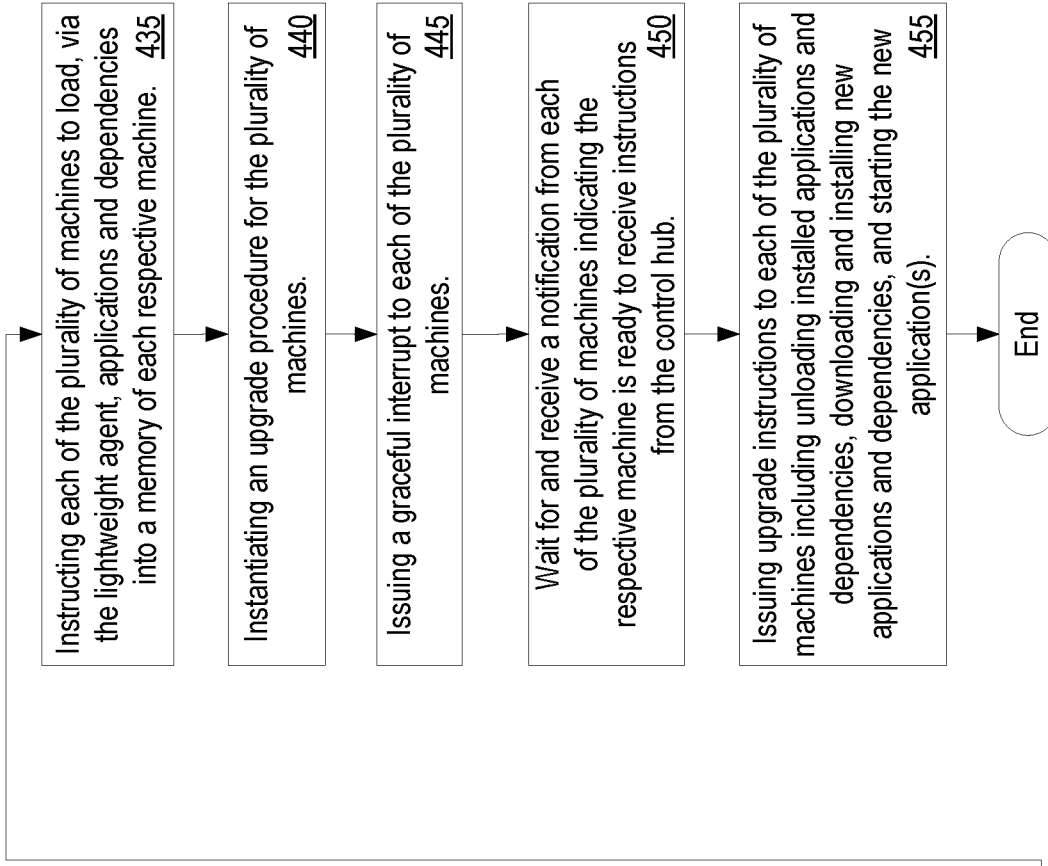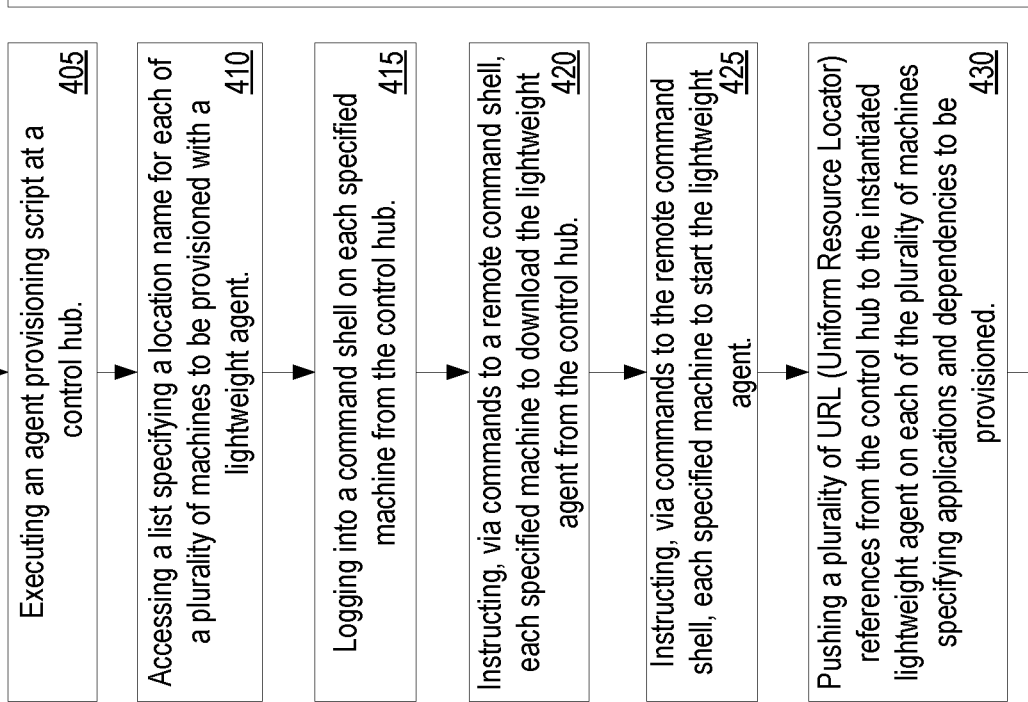

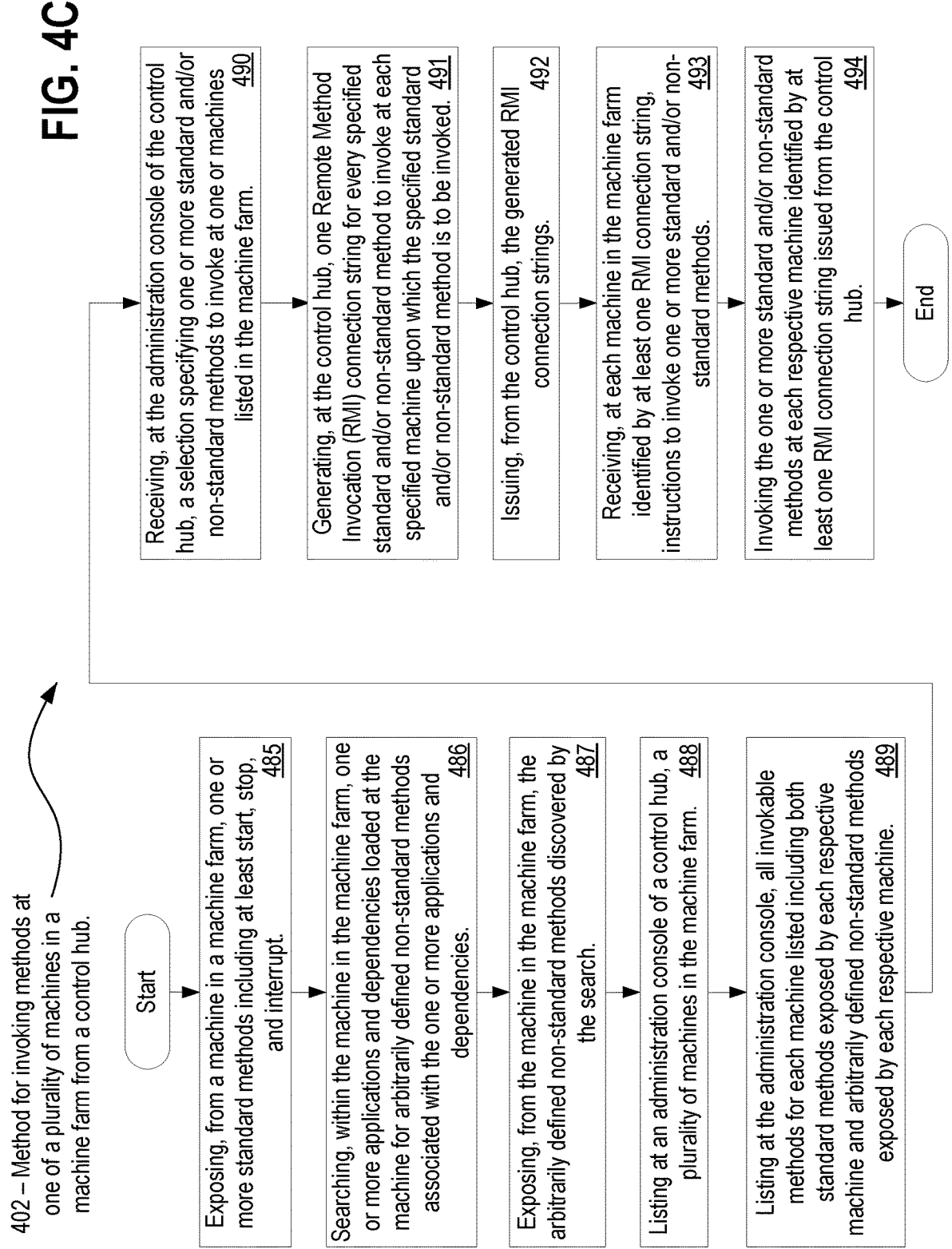

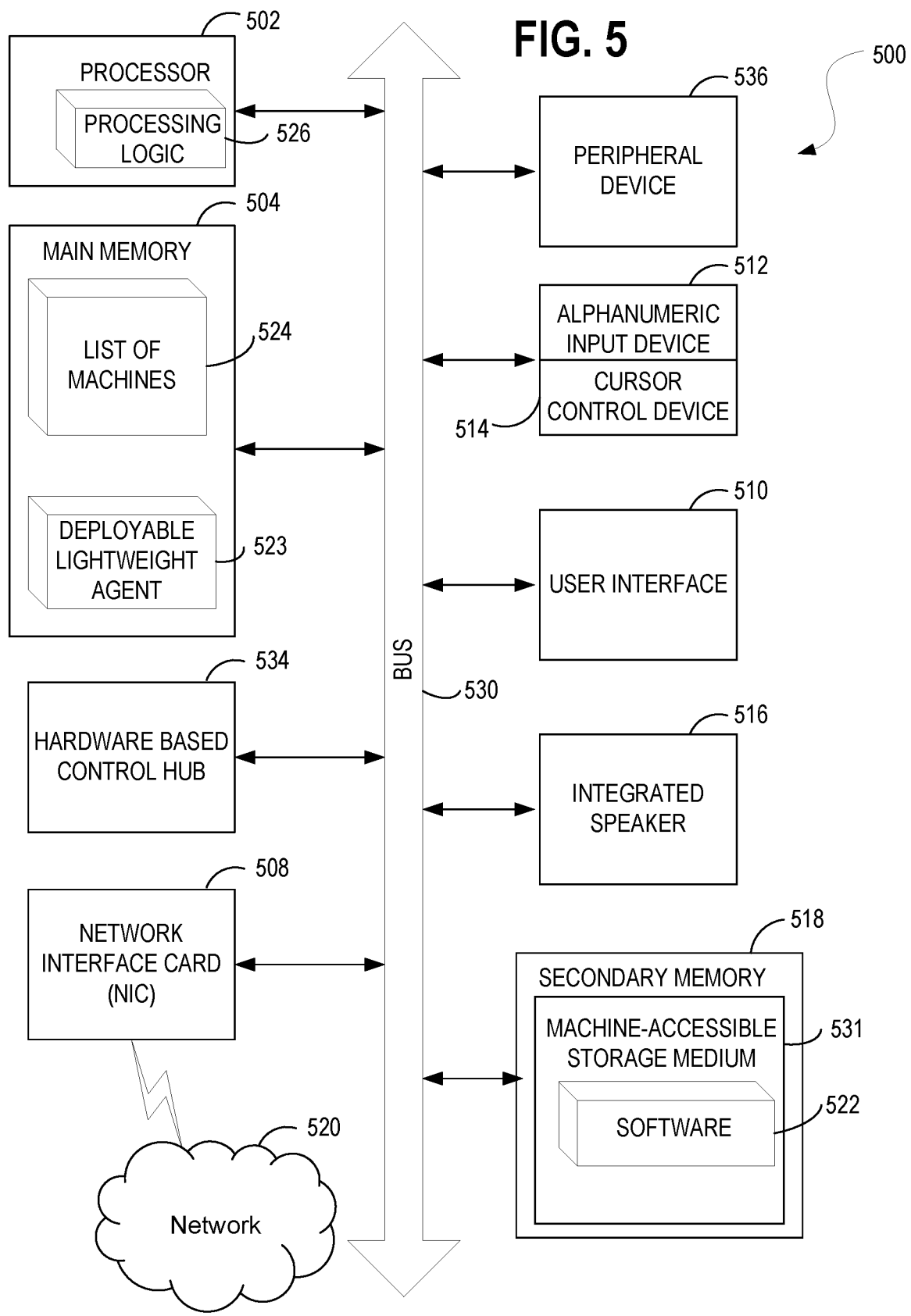

METHODS AND SYSTEMS FOR AUTOMATING DEPLOYMENT OF APPLICATIONS IN A MULTI-TENANT DATABASE ENVIRONMENT

CLAIM OF PRIORITY

This divisional application is related to, and claims priority to, the divisional application entitled, "METHODS AND SYSTEMS FOR AUTOMATING DEPLOYMENT OF APPLICATIONS IN A MULTI-TENANT DATABASE ENVIRONMENT," filed on Nov. 12, 2019, having an application number of Ser. No. 16/681,017; the divisional application entitled, "METHODS AND SYSTEMS FOR AUTOMATING DEPLOYMENT OF APPLICATIONS IN A MULTI-TENANT DATABASE ENVIRONMENT," filed on Nov. 30, 2016, having an application number of Ser. No. 15/365,772; the divisional application entitled "METHODS AND SYSTEMS FOR AUTOMATING DEPLOYMENT OF APPLICATIONS IN A MULTI-TENANT DATABASE ENVIRONMENT," filed on Jul. 7, 2015, having an application number of Ser. No. 14/793,271; and non-provisional utility application entitled "METHODS AND SYSTEMS FOR AUTOMATING DEPLOYMENT OF APPLICATIONS IN A MULTI-TENANT DATABASE ENVIRONMENT," filed on Mar. 21, 2011, having an application number of Ser. No. 13/052,897; and provisional utility application entitled "METHODS AND SYSTEMS FOR AUTOMATING DEPLOYMENT OF APPLICATIONS IN A MULTI-TENANT DATABASE ENVIRONMENT," filed on May 18, 2010, having an application number of 61/345,977, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to methods and systems for automating deployment of applications in a multi-tenant database environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to disclosed embodiments.

Conventional large scale farms of machines or machine farms lack sufficient automated architecture that provides functionality to automate provisioning for use of each or any of the respective machines in the farm, including remote installation and upgrading of test applications, Java™ based applications, and the like, as well as general management and maintenance of machines within the farm. Further lacking in conventional mechanisms is functionality to easily run the respective applications hosted by such machines in an automated fashion, without requiring human intervention.

Improved mechanisms for automating deployment of applications to multiple machines, such as those operating within a machine farm or a datacenter, is therefore desirable. Solutions to the above mentioned problems and other benefits of Applicants' disclosed embodiments are described in additional detail below.

BRIEF DESCRIPTION OF THE DRAWINGS

Embodiments of the present invention are illustrated by way of example, and not by way of limitation, and can be more fully understood with reference to the following detailed description when considered in connection with the figures in which:

FIGS. 4A, 4B, and 4C are flow diagrams illustrating methods for automating deployment of applications in accordance with disclosed embodiments; and FIG. 5 illustrates a diagrammatic representation of a machine in the exemplary form of a computer system, in accordance with one embodiment.

DETAILED DESCRIPTION

Figure 1:
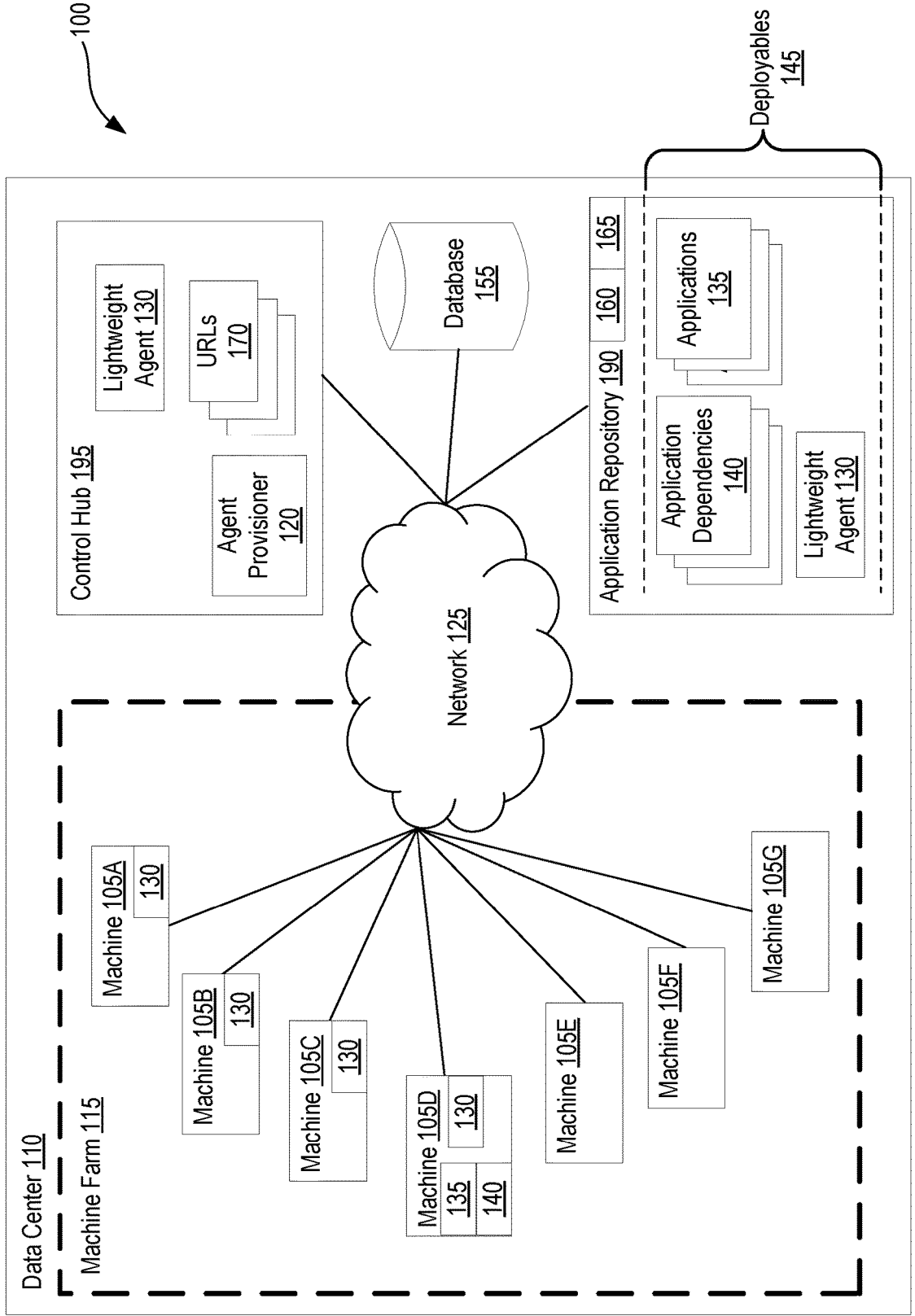
FIG. 1 depicts an exemplary architectural overview of the environment in which embodiments may operate.

Described herein are systems, devices, and methods for automating deployment of applications in a multi-tenant database environment, for example, automating application deployment onto respective machines within a machine farm without requiring human intervention.

In a particular embodiment, such mechanisms include managing a plurality of machines operating as a machine farm within a datacenter by executing an agent provisioning script at a control hub within the datacenter instructing the plurality of machines to download and instantiate a lightweight agent; pushing a plurality of URL (Uniform Resource Locator) references from the control hub to the instantiated lightweight agent on each of the plurality of machines specifying one or more applications to be provisioned and one or more dependencies for each of the one or more applications; and loading, via the lightweight agent at each of the plurality of machines, the one or more applications and the one or more dependencies for each of the one or more applications into memory of each respective machine.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments of are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architectural overview 100 of the environment in which embodiments may operate. Within datacenter 110, also referred to as a host organization, are a plurality of machines 105A-G operating as a machine farm 115. A network 125 connects the machines 105A-G with a control hub 195 and an application repository 190.

In one embodiment, control hub 195 executes an agent provisioning script (e.g., via agent provisioner 120). Agent provisioner 120 or an agent provisioning scrip instructs each of the plurality of machines 105A-G to download and instantiate a lightweight agent 130. The lightweight agent 130 is depicted as a deployable 145 within the application repository 190. In alternative embodiments, the lightweight agent 130 resides within the control hub 195 and is pushed to the respective machines 105A-G directly from the control hub 195.

Lightweight agent is depicted as having already been downloaded to some of the machines 105A-G, including machine 105A, machine 105B, machine 105C, and machine 105D. Machines 105E, 105F, and 105G do not yet have a lightweight agent downloaded or instantiated upon them.

Agent provisioner 120 or an agent provisioning scrip additionally pushes a plurality of URL (Uniform Resource Locator) references 170 from the control hub 195 to the instantiated lightweight agent 130 on each of the plurality of machines (e.g., machines 105A-D having the lightweight agent 130 downloaded thereupon). The URLs 170 specify one or more applications 135 to be provisioned and one or more dependencies 140 for each of the one or more applications 135.

The lightweight agent 130 at each of the plurality of machines loads the one or more applications 135 and the one or more dependencies 140 for each of the one or more applications into memory of each respective machine (e.g., machines 105A to 105D as shown in FIG. 1). Loading the one or more applications 135 and the one or more dependencies 140 may constitute the control hub 195 triggering or initiating the loading of the one or more applications 135 and the one or more dependencies 140, for example, by sending instructions, or manipulating the lightweight agent 130 via commands issued (e.g., through a command shell or other interface) at each of the machines, responsive to which the machines download the necessary applications 135 and dependencies 140 based on the URLs 170. In an alternative embodiment, once deployed, each lightweight agent 130 operates autonomously to retrieve the necessary applications 135 and dependencies 140 based on the URLs 170 upon receipt of the URLs or responsive to receiving the URLs 170.

Within application repository 190, two interfaces are depicted, control interface 160 and URL interface 165. Control interface 160 provides a mechanism over which control hub 195 may interact with application repository 190 as necessary. URL interface 165 provides a mechanism over which the machines 105A-G in the machine farm 115 may interact with the application repository. More particularly, the machines 105A-G, upon having received URLs 170 from the control hub 195, may commence to download the one or more applications 135 to be provisioned and one or more dependencies 140 for each of the one or more applications 135 from the application repository 190, as specified by the control hub. For example, the machines 105A-G may communicate with the application repository 190 via HTTP (Hyper Text Transfer Protocol) and/or FTP (File Transfer Protocol), or other available protocols, as specified by the one or more URLs 170.

In one embodiment, the lightweight agent 130 is a small program which functions similar to a bootstrap loader insomuch as it provides each respective machine 150A-G having the lightweight agent 130 with minimal but sufficient logic to retrieve and load more sophisticated functionality. For example, in development and testing of one embodiment as described herein, the deployable 145 lightweight agent 130 constituted less than 300 total lines of code and required nothing more than a base JDK (Java Development Kit), hence the "lightweight" description. Obviously, a deployable agent to serve such a role may vary in size and sophistication, but still operating in accordance with the disclosed embodiments.

In one embodiment, the control hub 195 manages a database 155 specifying relationships between all available applications 135 and all dependencies 140 for the available applications 135. For example, while multiple dependencies 140 are provided (e.g., classes, objects, linkable programs, etc.), not all dependencies 140 are required for every application 135. Additionally, while several different and distinct applications 135 are available, different subsets of dependencies 130 will be required depending on which application 135 is being loaded and utilized. These relationships and requirements are tracked by database 155 in accordance with one embodiment.

The applications themselves may be test cases or test suites for validating code, testing interfaces, and the like. Some applications may constitute grid based functionality in which each machine 105A-G operates as a node within a grid that, for example, computes data and reports back results for use in a master application.

Figure 2:
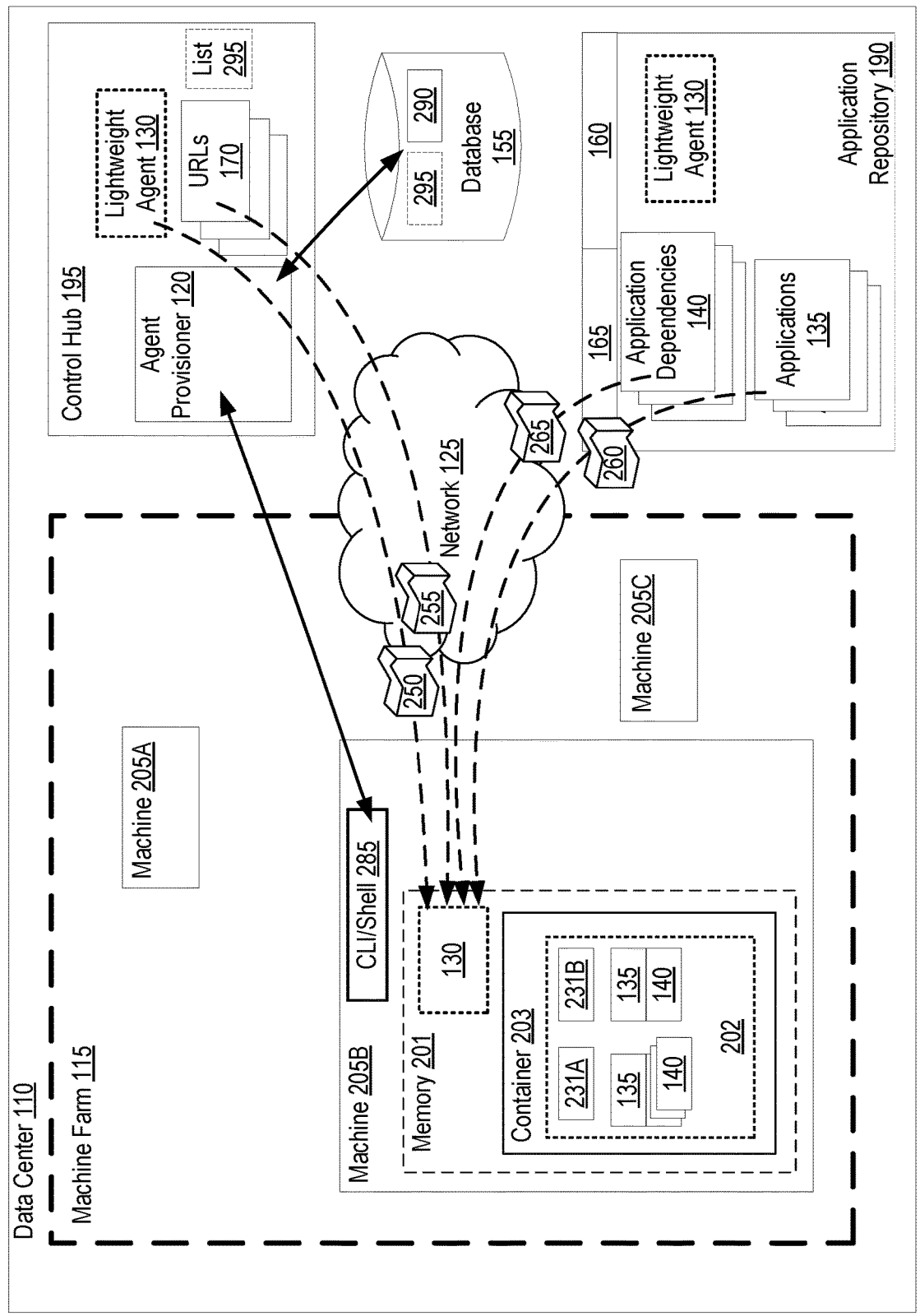
FIG. 2 depicts an alternative exemplary architectural overview of the environment in which embodiments may operate.

FIG. 2 depicts an alternative exemplary architectural overview 200 of the environment in which embodiments may operate. The lines connecting various components explicitly to the network 125 have been removed for the sake of clarity, however, the components are obviously still communicatively interconnected via the network 125. Additionally, while only internal detail of machine 205B is shown, the other machines 205A and 205C operate in an identical fashion. In some embodiments, the numbers and scale of deployed machines may be significant, for example, well into the hundreds of machines controllable via a single control hub. FIG. 2 depicts in additional detail the manner in which machines (e.g., 105A-D) of FIG. 1 and machines 205A-C here, may be provisioned in accordance with disclosed embodiments.

For example, in accordance with one embodiment, the agent provisioner 120 or agent provisioning script instructs each of the plurality of machines (e.g., 205A, 205B, and 205C) to download and instantiate the lightweight agent 130. In such an embodiment, instructing the plurality of machines (e.g., 205A, 205B, and 205C) to download and instantiate the lightweight agent 130 includes the agent provisioner 120 or agent provisioning script to: access a list 295 specifying a location name for each of the plurality of machines 205A-C to be provisioned with the lightweight agent. The list 295 may reside locally within control hub 195 or, in alternative embodiments, may reside within and be accessed from database 155. List 295 may include a listing of one or more data including: host names, host IP addresses (Internet Protocol addresses), MAC addresses (Media Access Control addresses), passwords, encryption keys, zoning, hardware type or hardware specification data, etc. Database 155 further includes a table structure 290 specifying the relationships between all available applications 135 and all dependencies 140 for the available applications 135, which may be utilized by the control hub 195 in determining what applications and dependencies to provision to the machines 205A-C (e.g., by pushing URLs 170 corresponding to the determined applications 135 and all dependencies 140). The doubled headed line between agent provisioner 120 and database 155 depicts the interactions by which the agent provisioner retrieves information from database table structure 290 or list 295, as necessary.

In such an embodiment, instructing the plurality of machines 205A-C to download and instantiate the lightweight agent 130 additionally includes, for each of the plurality of machines 205A-C specified by the list 295: a) logging in to a command shell 285 (e.g., a Command Line Interface (CLI) or other remotely accessible interface) on the specified machine (e.g., one of 205A, 205B, and 205C) from the control hub 195; b) instructing, by issuing commands to the command shell 285, the specified machine (e.g., one of 205A, 205B, and 205C) to download the lightweight agent 130 from the control hub 195; and c) instructing, by issuing the commands to the command shell, the specified machine (e.g., one of 205A, 205B, and 205C) to start the lightweight agent 130. In alternative embodiments, the control hub 195 may access the command shell 285 and instruct each respective machine to download the lightweight agent 130 from the application repository 190. The straight double headed line between agent provisioner 120 and the command shell 285 of machine 205B represents the interaction and connectivity between the two elements in fulfillment of the above communication of commands and triggering of the described events.

In one embodiment, each of the plurality of machines 205A-C pulls the lightweight agent 130 from the control hub 195 responsive to the agent provisioning script or the agent provisioner 120. In such an embodiment, each of the plurality of machines 205A-C pulls the one or more applications 135 and the one or more dependencies 140 for each of the one or more applications 135 from a central application repository 190. Therefore, in accordance with the described embodiments, control hub 195 may cause the machines 205A-C to pull the lightweight agent 130, or the control hub 195 may directly push the lightweight agent 130 to each of the machines 205A-C (e.g., via remote copy or other such mechanisms capable of pushing data and/or files onto another machine).

In accordance with one embodiment, the control hub 195 and the central application repository 190 each reside on physically separate and distinct computer servers. In accordance with one embodiment, each of the plurality of machines 205A-C in the machine farm 115 are physically separate and distinct computer servers from the control hub 195 and from the central application repository 190. In such an embodiment, each of the plurality of machines 205A-C in the machine farm 115 are physically separate and distinct computer servers from each other. In alternative embodiments, at least a portion of the machines 205A-C are distinct computing blades within a blade server or blade machine or distinct nodes within a computing grid of nodes. In alternative embodiments, at least a portion of the machines 205A-C are distinct virtual machines co-located upon a single physical computing device, but are virtualized to appear as independent and physically distinct computing devices.

In one embodiment, each of the physically separate and distinct computer servers (e.g., machines 205A-C) and the control hub 195 are communicatively interfaced through a high speed network (e.g., 125) of the datacenter 110.

In accordance with one embodiment, the lightweight agent 130 is downloaded and instantiated within memory 201 of each of the plurality of respective machines 205A-C. In such an embodiment, execution of the lightweight agent 130 is isolated to the memory 201 of each of the respective machines 205A-C. In one embodiment, the one or more applications 135 and the one or more dependencies 140 for each of the one or more applications reside only within the memory 201 of the respective plurality of machines. In one embodiment, each of the lightweight agents 130, the one or more applications 135, and the one or more dependencies 140 for each of the one or more applications 135, do not access or reference hard disk drive storage on any of the plurality of respective machines 205A-C having the lightweight agent 130 downloaded and instantiated thereon. Stated differently, regardless of whether any one of the respective machines 205A-C is provisioned with a hard disk drive, the lightweight agent 130 operates memory resident and does not rely upon, or make use of, the hard disk drive. In accordance with other embodiments, the applications 135 and dependencies 140 operate in the same manner. In some embodiments, the machines 205A-C are headless, keyboardless, and diskless, but include at least a CPU and memory upon which to execute and perform instructions (e.g., "bare metal" machines).

Further depicted within FIG. 2 are elements 250, 255, 260, and 265. Element 250 represents the lightweight agent 130 being provisioned to machine 205B in accordance with one embodiment. In such an embodiment, the lightweight agent 130 is pushed to machine 205B from control hub 195. Element 255 represents the plurality of URLs 170 which are pushed to machine 205B by the control hub 195 enabling machine 205B, via its lightweight agent 130, to pull the appropriate applications 135 and dependencies 140 from the application repository. Element 260 represents the lightweight agent 130 pulling one or more applications 135 from the application repository 190 as specified by the control hub 195 (e.g., based on the plurality of URLs 170 pushed to the machine). And element 265 represents the lightweight agent 130 pulling one or more application dependencies 140 from the application repository 190 as specified by the control hub 195 in support of the pulled applications 135.

In accordance with one embodiment, the control hub 195 manages an upgrade procedure for the plurality of machines 205A-C. In such an embodiment, the upgrade procedure includes the control hub issuing a graceful interrupt to each of the plurality of machines 205A-C, in which the graceful interrupt permits each respective machine to complete currently executing work, for example, each of the plurality of respective machines 205A-C will allow the one or more applications 135 currently executing work to complete (e.g., without early termination) responsive to receiving a graceful interrupt. In one embodiment, the upgrade procedure includes each of the plurality of respective machines to: stop accepting work instructions responsive to the graceful interrupt issued by the control hub; to respond to the control hub with a notification indicating the respective machine is ready to receive instructions from the control hub; and to receive upgrade instructions from the control hub 195. In one embodiment, the upgrade procedure operates asynchronously, such that various operations undertaken by each of the plurality of respective machines 205A-C will begin and end on their own schedules and time tables. For example, one machine may be continuing execution of its current work, while another machine receives upgrade instructions from the control hub 195.

In one embodiment, the upgrade procedure further includes the control hub 195, responsive to receiving the notification from each respective machine 205, performs an unloading operation of a test class installation (e.g., an application 135) from the machine's memory, via the machine's lightweight agent (e.g., the control hub 195 instructs lightweight agent 130 to unload specified test class or other installed application 135). In such an embodiment, the upgrade procedure further includes the control hub 195 to perform an unloading operation of all dependencies 140 associated with the test class installation (e.g., application dependencies 140) from the machine's memory 201 as specified by the control hub 195 (e.g., where the operation is implemented via the machine's lightweight agent). In such an embodiment, the upgrade procedure further includes the control hub 195 to cause or instruct the machine's lightweight agent to download and install a new application 135 from an application repository 190 to the machine's memory 201 as specified by the control hub 195 and download and install, via the machine's lightweight agent, all dependencies 140 for the new application 135 from the application repository 190 to the machine's memory 201 as specified by the control hub 195. In such an embodiment, the upgrade procedure further includes the control hub 195 to start, via the machine's lightweight agent, the new application 135 within the respective machine (e.g., one of 205A-C as depicted at FIG. 2, or one of 105A-G as depicted by FIG. 1).

In accordance with one embodiment, the lightweight agent 130 implements a container 203 for managing class objects within each of the respective machines 205A-C. In such an embodiment, loading the one or more applications 135 into the memory 201 of the respective plurality of machines 205A-C includes: a) allocating an exclusive memory space 202 for each of the one or more applications 135 within the memory 201 of the respective machine (e.g., one of 205A-C); b) uniquely associating a dynamically generated URL class loader 231A and 231B for each of the one or more applications 135 within the exclusive memory space 202 allocated to the one or more applications 135; and loading, via the uniquely associated URL class loader 231A and 231B, each respective application 135 into the exclusive memory space 202 and each of the one or more dependencies into the exclusive memory space 202 allocated to the respective application 135 based on the plurality of URL references 170 pushed to the lightweight agent 130.

In one embodiment, the container 203 for managing class objects implemented via the lightweight agent includes a managed bean server. In one embodiment, the lightweight agent 130 is implemented as a JVM (Java Virtual Machine) which includes the managed bean server (e.g., MBeanServer). In one embodiment, the lightweight agent 130 further includes a Java Remote Method Invocation Application Programming Interface (e.g., a Java RMI), or a Java based or Java compatible Application Programming Interface (API) that performs the object-oriented equivalent of Remote Procedure Calls (RPC), or another Remote Method Invocation (RMI) mechanism. The lightweight agent 130 may further include an RMI registry and a custom security manager. In such embodiments, the lightweight agent 130 acts as a remote agent when communicating with the control hub 195. The lightweight agent 130 installed onto each of the machines 205A-C in the server farm or machine farm 115 exposes Transmission Control Protocol (TCP) ports that are used to send application control requests. The methods for application control include, for example, load, stop, start, and unload. Additionally, within the applications 135 themselves, additional methods may be arbitrarily defined in accordance with the disclosed embodiments. Such additional methods are available to be executed remotely once the application 135 has been loaded into the lightweight agent's 130 MBeanServer.

In one embodiment, the MBeanServer is responsible for listening for external commands and is additionally responsible for staying alive within each of the machines 205A-C (e.g., responsible for keeping itself and the communication capabilities of the lightweight agent 130 alive so that each machine remains responsive to remote commands, without becoming a dead node, requiring human interaction, such as a hard reboot). In one embodiment, the managed bean server provides a container 203 for plugging in applications 135.

In one embodiment, the managed bean server exposes standard interfaces to the control hub 195. For example, the standard interfaces exposed may include "start" and "interrupt." In some embodiments, a graceful interrupt and a hard interrupt may be exposed, or defined and selectable by the issuing entity (e.g., the control hub 195).

In one embodiment, the managed bean server additionally provides query and self discovery mechanisms which dynamically discover/identify/find all non-standard and arbitrarily defined interfaces within provisioned applications 135. In such an embodiment, other than implementing standard stop, interrupt, stop type methods, custom interfaces defined by code authors are also discoverable and will be exposed by the managed bean server upon discovery, without requiring further intervention. Such exposed interfaces, whether standard or arbitrarily defined, are thus accessible to and accessible via the control hub 195 which may issue commands, instructions, and interactions to the various exposed methods to launch events, tests, and so forth. Such exposed methods are therefore also manipulatable via administration consoles and interfaces provided thorough the control hub 195 as will be described in additional detail below.

In one embodiment, at least a portion of the machines 205A-C in the machine farm 115 are provisioned with a JMX (Java™ Management Extension) based or JMX compatible lightweight agent 130 which receives remote instructions from a control hub 195. In one embodiment, when an application 135 is loaded and an operation is executed remotely, all processing happens within a JVM of a JMX based or JMX compatible lightweight agent 130. JMX based lightweight agents 130 may automatically pull down application 135 code and dependency 140 Java Archives (JARs) from a application repository 190, and subsequently run each application 135 represented within the application 135 code and dependency 140 JARs in a separate classloader but within the same JVM (Java™ Virtual Machine) based or JVM compatible interpreter. Such a mechanism yields complete control over the deployment and lifecycle management of deployed Java based or Java compatible applications in a large scale distributed system, all from a single remote controller application accessible from, for example, control hub 195. Such an approach may simplify the role of a system administrator, and thus reduce cost and complexity and the risk of human error on behalf of an Enterprise (e.g., a host organization or a business Enterprises and an associated computing environment that supports the business objectives of the host organization/business Enterprise through computing systems in, for example, a datacenter 110 or machine farm 115).

In one embodiment, a JMX based or JMX compatible lightweight agent 130 loads managed applications 135 and dependent libraries and/or application dependencies 140 from an application repository 190 via URL mappings as set forth by one or more of the plurality of URLs 170 pushed to the various machines (205A-C. In such an embodiment, relationships between the applications 135 and the dependent libraries and/or application dependencies 140 are managed within a database schema accessible to control hub 195 or via a relationships table structure 290 as described above. The database schema and/or relationships table structure 290 may reside within control hub 195 as an alternative to being accessible from database 155 as described above. In one embodiment, the applications 135 themselves are packaged as JAR files, and as such, do not include the dependent libraries and/or application dependencies 140 because all dependencies 140 are handled within classloaders 231A and 231B which are created dynamically within the JMX based or JMX compatible lightweight agent's 130 MBeanServer. When dependent libraries and/or application dependencies 140 are needed by the applications 135, they are populated in the classloader 231A or 231B assigned to the loaded application 135 operating within an isolated memory space (e.g., exclusive memory space 202).

Classloader isolation is supported in accordance with certain embodiments. Classloader isolation facilitates the hosting of multiple applications 135 within a single JVM, where each application 135 is given it's own dynamically generated URL Classloader 231A or 231B. By isolating each classloader 231A or 231B, dependencies 140 between an application 135 and it's corresponding dependent libraries and/or application dependencies 140 are strictly maintained while also creating a process space dedicated to each application within the agent's JVM. For example, exclusive memory space 202 is allocated to the one or more applications 135 within the memory 201 of the respective machine (e.g., one of 205A-C). In certain embodiments, the machine 205A-C and its JMX based or JMX compatible lightweight agent 130 makes exclusive use of URL Classloaders 231A and 231B, which in turn assures that there are no dependencies 140 on any local file system or hard disk drive within the machine 205A-C upon which the lightweight agent 130.

Embodiments which implement URL class loaders 231A and 231B and managed bean servers as described above additionally make applications pluggable, and are able to better leverage a highspeed network 125 available within the datacenter 110 for downloading and provisioning applications 135 and dependencies 140 to the machine farm 115.

In accordance with one embodiment, a non-transitory computer readable storage medium has instructions stored thereon. In such an embodiment, the instructions, when executed by control hub 195 having a processor and memory therein, cause the control hub 195 to perform operations, perform a method, or carry out instructions, for managing a plurality of machines 205A-C within a datacenter 110 by implementing operations and functionality as described in accordance with the various embodiments set forth above.

For example, in one embodiment, instructions stored upon a non-transitory computer readable storage medium causes a control hub 195 to perform operations including instructing each of a plurality of machines 205A-C to download and instantiate a lightweight agent 130 (e.g., either JMX based, JMX compatible, or non-JMX based). In such an embodiment, operations further include pushing a plurality of URL references 170 from the control hub 195 to the instantiated lightweight agent 130 on each of the plurality of machines 205A-C, in which the plurality of URL references 170 specify one or more applications 135 to be provisioned and one or more dependencies 140 for each of the one or more applications 135 also to be provisioned in support of the applications 135. In such an embodiment, operations further include instructing the lightweight agent 130 at each of the plurality of machines 205A-C to load the one or more applications 135 and the one or more dependencies 140 for each of the one or more applications 135 into memory 201 of the respective one of the plurality of machines 205A-C.

In accordance with one embodiment, a remote control Graphical User Interface (GUI) is implemented in which each of the plurality of deployed lightweight agents 130 are individually graphically displayed via the GUI and individually controllable via a JMX remote control client, implemented as a servlet in the control hub 195. In such an embodiment, connections may be established to each of the plurality of deployed lightweight agents 130 by specifying both the JMX and RMI URL's to create a connection string of the form of: "service:jmx:rmi://<HOST_NAME>:<JMX_PORT>/jndi/rmi://<HOST_NAME>:<RMI_PORT>/server."

Upon establishing a connection to one of the lightweight agents 130, two separate MBeans are created. A first for the application 135 that is being loaded and a second for the classloader 231A or 231B that the loaded application will use (e.g., be uniquely associated with and under the control of). When the application MBean is created, an application-specific classloader MBean is provided to a createMBean method, associating the two MBeans and allowing the application 135 to load its main and dependent libraries and/or application dependencies 140 in an isolated manner, within the exclusive memory space 202 established for the one or more applications 135 within the memory 201 of the respective machine (e.g., one of 205A-C).

A jconsole connection may be established with any of the one or more running lightweight agents 130 via the GUI. JConsole is a graphical monitoring tool to monitor Java Virtual Machines (JVM) and java based or java compatible applications on both local and remote machines, such as the remote applications 135 executing on the machines 205A-C which are remote from the control hub 195.

In one embodiment, the upgrade procedure described above is implemented via an external client application which uses upgrade information inserted into the control hub 195 to perform automatic upgrades of JMX based or JMX compatible applications 135 executing within JMX based or JMX compatible lightweight agents 130. In one embodiment, the external client application waits until a targeted application 135 provisioned to one of the plurality of machines 205A-C is marked as offline via the control hub 195. In such an embodiment, the external client application then proceeds to destroy the classloader 231A and 231B and unload the application 135 MBean from the JMX based or JMX compatible lightweight agent 130. The lightweight agents 130 disables URLConnection caching to prevent stale classes (e.g., classes embodying applications 135 and dependencies 140) from being used once an upgrade is performed. In embodiments that make exclusive use of URLClassloaders (e.g., MLetClassloaders), an upgrade or reload of an application 135 destroys all references to the application 135 and its associated classloader 231A and 231B. In such an embodiment, the external client application then reloads the specified application 135 and recreates the classloader 231A and 231B MBean to make the application 135 available for execution and management (e.g., makes it deployable 145). MLetClassloaders are a class that represents the class loader that the m-let service uses to load classes and resources. The term "Mlet" or "M-let" refers to a "Management applet," which is a utility MBean to load, instantiate and register MBeans in the MBeanServer.

In one embodiment, a GUI additionally provides an administration console to select the machines 205A-C within the machine farm 115, select the application(s) 135 executing within the machine farm 115, and/or select the associated remote method(s) to invoke which are exposed to the control hub 195 and made accessible and viewable via the GUI of the control hub's 195 administration console, in accordance with the above embodiments. For example, such an administration console permits system administrators to perform remote operations on applications 135 and to load/unload the applications 135 from deployed lightweight agents 130. The administration console again makes use of the servlet that is exposed on the control hub 195. Such an administration console further permits an administrator to perform operations on multiple lightweight agents 130 deployed within the machine farm 115 concurrently. For example, an administrator may start a specific application 135 on several different machines 205A-C via the administration console which permits the administrator to select the machines 205A-C, select the application(s) 135, and select the associated remote method(s) to invoke, in accordance with the disclosed embodiments.

Figure 3:
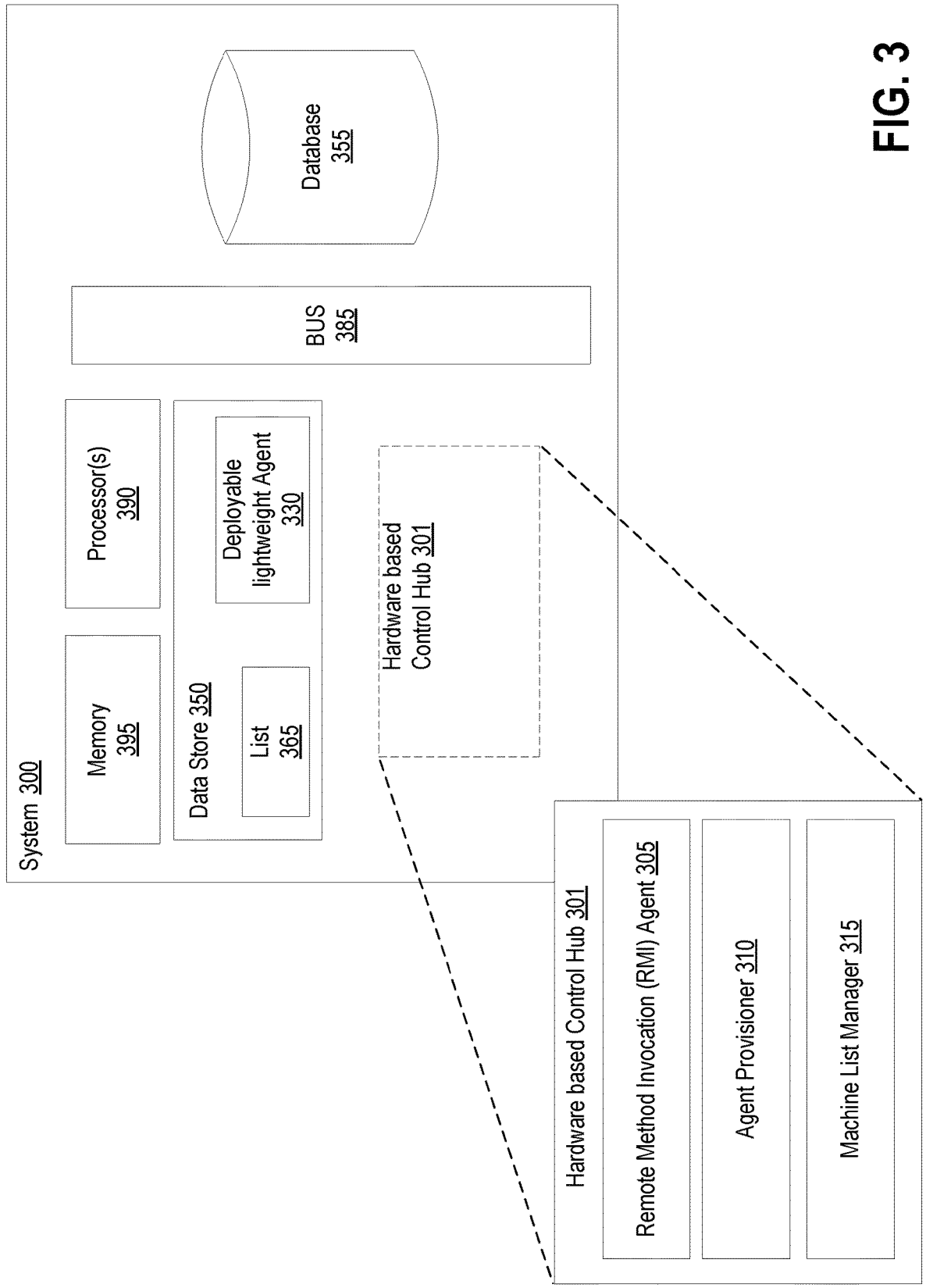
FIG. 3 shows a diagrammatic representation of a system 300 in which embodiments may operate, be installed, integrated, or configured.

FIG. 3 shows a diagrammatic representation of a system 300 in which embodiments may operate, be installed, integrated, or configured.

In one embodiment, system 300 includes a memory 395 and a processor or processors 390. For example, memory 395 may store instructions to be executed and processor(s) 390 may execute such instructions. System 300 includes bus 385 to transfer transactions and data within system 300 such as transactions between hardware based control hub 101 and database 355 or the data store 350. System 300 further includes database 355 which may store a relationship table structure specifying the relationships between available applications and dependencies available from an application repository, and which control hub 301 may provision to remote machines (e.g., 105A-C as set forth in FIG. 1). Database 355 may additionally store a list of remote machines and location information for such machines (e.g., host names, IP addresses, etc.). Alternatively, such a list may be stored within data store 350 (e.g., list 365).

System 300 includes data store 350 to store data and information. Data store 350 stores a copy of deployable lightweight agent 330 in accordance with one embodiment.

Distinct within system 300 is hardware based control hub 301 which includes Remote Method Invocation (RMI) Agent 305, Agent Provisioner 310, and Machine List Manager 315. In accordance with one embodiment, Remote Method Invocation (RMI) Agent 305 enables hardware based control hub 301 to remotely communicate with, remotely trigger, remotely initiate, and remotely instruct lightweight agents 330 deployed within machines in a machine farm to perform actions and events as specified by the hardware based control hub 301. In such an embodiment, Agent Provisioner 310 deploys the deployable lightweight agent 330 to machines within a machine farm and Machine List Manager 315 provides a listing of the machines within the machine farm upon which the deployable lightweight agent 330 may be deployed and controlled and a location, location name, IP address, or other appropriate information for the machines in the machine farm so that the deployable lightweight agent 330 may be deployed by the hardware based control hub 301.

Figure 4B:
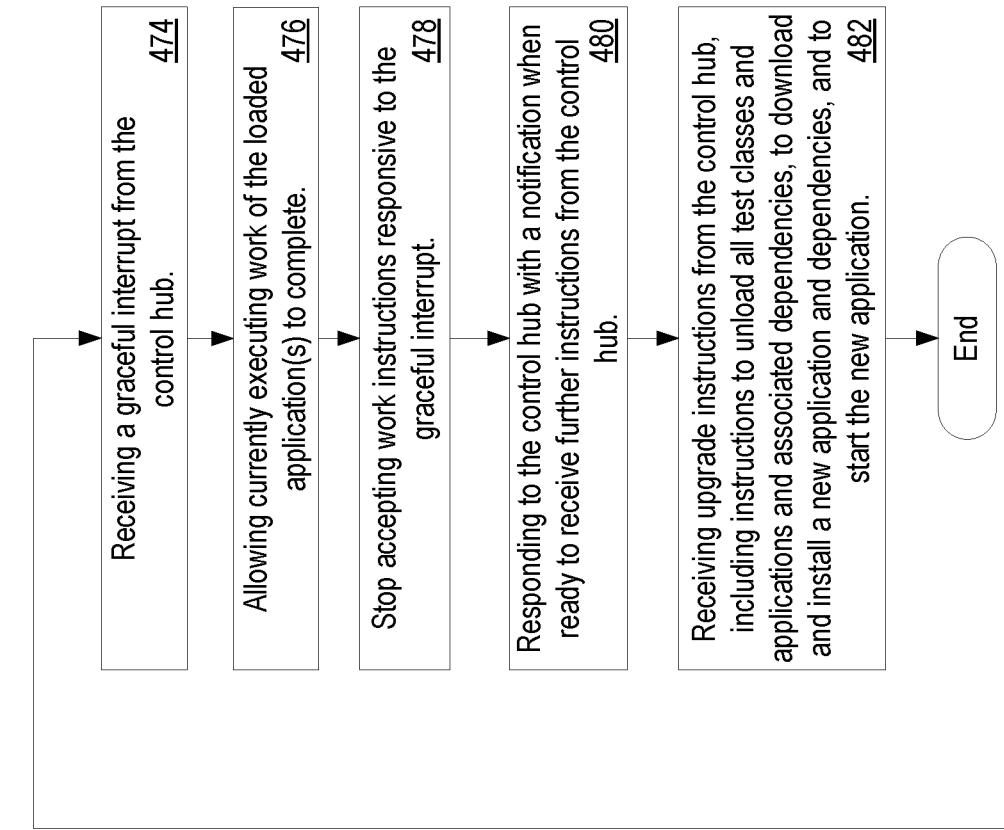

FIGS. 4A, 4B, and 4C are flow diagrams illustrating methods (400, 401, and 402) for automating deployment of applications in accordance with disclosed embodiments. Method 400 depicts operations for managing a plurality of machines operating as a machine farm in a datacenter. Method 400 operates within a control hub. Method 401 depicts operations for receiving automated deployments and application upgrades. Method 401 operates at one of a plurality of machines in a machine farm. Method 402 depicts operations for invoking methods within one or more machines in a machine farm from a control hub. Method 402 operates in conjunction with both a control hub and at least one machine within a machine farm. Methods 400, 401, and 402 may be performed by processing logic that may include hardware (e.g., circuitry, dedicated logic, programmable logic, microcode, etc.), software (e.g., instructions run on a processing device to perform various operations such as deploying, provisioning, issuing remote commands and control, etc.), or a combination thereof. In one embodiment, methods 400, 401, and 402 are performed by hardware logic, such as the hardware based control hub depicted at element 301 of FIG. 3 or by a machine within a machine farm such as those depicted at elements 105A-G of FIGS. 1 and 205A-C of FIG. 2. Some of the blocks and/or operations listed below are optional in accordance with certain embodiments. The numbering of the blocks presented is for the sake of clarity and is not intended to prescribe an order of operations in which the various blocks must occur.

Method 400 of FIG. 4A begins with processing logic executing an agent provisioning script at a control hub (block 405). At block 410, processing logic in a control hub accesses a list specifying a location name for each of a plurality of machines to be provisioned with a lightweight agent.

At block 415, processing logic in a control hub logs into a command shell on each specified machine from the control hub. The control hub may continue to execute instructions, or deploy a provisioning script which, when executed on a target machine, performs operations specified by the control hub. At block 420, processing logic instructs, via commands to a remote command shell, each specified machine to download the lightweight agent from the control hub. Alternatively, the control hub may deploy and execute the provisioning script, thus causing the target machine to pull or download the lightweight agent from the network (e.g., 125).

At block 425, processing logic instructs, via commands to the remote command shell, each specified machine to start the lightweight agent previously downloaded. Alternatively, the provisioning script may instantiate the lightweight agent subsequent to its pull or download operations.

At block 430, processing logic on the control hub pushes a plurality of URL (Uniform Resource Locator) references from the control hub to the instantiated lightweight agent on each of the plurality of machines specifying applications and dependencies to be provisioned.

At block 435, processing logic on the control hub instructs each of the plurality of machines to load, via the lightweight agent, applications and dependencies into a memory of each respective machine.

At block 440, processing logic on the control hub instantiates/triggers/initiates an upgrade procedure for the plurality of machines or a portion thereof. At block 445, processing logic on the control hub issues a graceful interrupt to each of the plurality of machines in furtherance of the upgrade procedure, or to the portion of machines for which the upgrade procedure is instantiated/triggered/initiated. At block 450, processing logic on the control hub waits for and receives a notification from each of the plurality of machines indicating the respective machine is ready to receive instructions from the control hub. The notifications from the respective machines are received asynchronously, as each respective machine reaches a state at which it issues such notifications.

At block 455, processing logic on the control hub issues upgrade instructions to each of the plurality of machines (in an asynchronous manner responsive to each of the received notifications), including unloading installed applications and dependencies, downloading and installing new applications and dependencies, and starting the new application(s).

Method 401 of FIG. 4B begins with processing logic executing one of any of a plurality of machines within a machine farm, where the processing logic pulls a lightweight agent from a control hub responsive to remote instructions from the control hub. Alternatively, the machine receives a provisioning script from the control hub, executes the provisioning script, and pulls the lightweight agent from the control hub based on instructions within the provisioning script (block 460).

At block 462, processing logic in the machine implements a container for managing class objects.

At block 464, processing logic in the machine receives a plurality of URL references specifying applications and dependencies to be downloaded. At block 466, processing logic in the machine downloads the applications and dependencies via the URL references.

At block 470, processing logic in the machine uniquely associates a dynamically generated URL class loader with each application. At block 472, processing logic in the machine loads, via the uniquely associated URL class loader, each respective application and its dependencies into the exclusive memory space allocated to the applications.

At block 474, processing logic in the machine responds to an upgrade procedure initiated by the control hub by first receiving a graceful interrupt from the control hub. At block 476, processing logic in the machine allows currently executing work of the loaded application(s) to complete in view of the graceful interrupt (e.g., the interrupt is not a hard interrupt demanding immediate termination). At block 478, processing logic in the machine stops accepting work instructions responsive to the graceful interrupt.

At block 480, processing logic in the machine responds to the control hub with a notification when the machine is ready to receive further instructions from the control hub (e.g., indicating to the control hub that it is now ready to proceed with further instructions, other instructions, or the upgrade procedure initiated by the control hub). The actual notification sent may be only a "ready" notice or a message indicating the machine is at a state capable of receiving further instruction.

At block 482, processing logic in the machine receives upgrade instructions from the control hub, including instructions to unload all test classes and applications and associated dependencies, to download and install a new application and dependencies, and to start the new application (e.g., by either instructing the lightweight agent to start the new application, or by restarting the lightweight agent thus causing it to restart its known applications upon startup).

Method 402 of FIG. 4C begins with processing logic exposing, from a machine in a machine farm, one or more standard methods including at least start, stop, and interrupt (block 485).

At block 486, processing logic searches, within the machine in the machine farm, one or more applications and dependencies loaded at the machine for arbitrarily defined non-standard methods associated with the one or more applications and dependencies and at block 487, processing logic exposes, from the machine in the machine farm, the arbitrarily defined non-standard methods discovered by the search.

At block 488, processing logic at an administration console of a control hub lists a plurality of machines in the machine farm. For example, the administration console may list all, active, a zone, a subset, or a specified type or class of machines, etc.

At block 489, processing logic lists at the administration console, all invokable methods for each machine listed by the administration console, including both standard methods exposed by each respective machine and arbitrarily defined non-standard methods exposed by each respective machine.

At block 490, processing logic at the administration console of the control hub receives a selection specifying one or more standard and/or non-standard methods to invoke at one or machines listed in the machine farm.

At block 491, processing logic at the control hub generates one Remote Method Invocation (RMI) connection string for every specified standard and/or non-standard method to invoke at each specified machine upon which the specified standard and/or non-standard method is to be invoked. For example, if two machines are selected via the administration console and two invokable methods are selected at each, four RMI strings would be generated in accordance with such an embodiment.

At block 492, processing logic at the control hub issues the generated RMI connection strings, for example, invoking them via a network connecting the control hub with the machines in the machine farm.

At block 493, processing logic at each machine in the machine farm identified by at least one RMI connection string receives instructions to invoke one or more standard and/or non-standard methods and at block 494, processing logic at each respective machine identified by at least one RMI connection string issued from the control hub invokes the one or more standard and/or non-standard methods in accordance with the instructions received by the corresponding machine.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment, as a blade within a blade server, as a node within a computing grid, or as a physically separate and distinct machine within a machine farm of a datacenter. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. Additionally, while the embodiment set forth at FIG. 5 depicts various elements, each of which are described below, not all elements of the machine are required in accordance with certain embodiments. For example, some embodiments make use of a "bare metal" machine deployed within a machine farm, in which the machine operates headless (e.g., without a display device such as user interface 510) and keyboardless (e.g., without alphanumeric input device 512 and cursor control device 514). In some embodiments, machines within a machine farm operate without use of a hard disk drive. However, in all embodiments, machines deployed within a machine farm include at least a CPU (e.g., processor 502) and memory (e.g., main memory 504), but the contents of such memory may vary from that which is depicted at FIG. 5. Alternative combinations of elements depicted are utilized in machines which embody a control hub, a database, and/or an application server as described in the embodiments set forth above.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a list of machines (e.g., names and location information for machines in a machine farm) 524 and a deployable lightweight agent 523 which is pushed to communicatively interfaced machines in a machine farm. Main memory 504 and its sub-elements (e.g. 523 and 524) are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.). The computer system 500 may further include a Hardware based control hub 534 to manage a plurality of machines operating as a machine farm within a datacenter in accordance with the described embodiments.

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method to target a deployment group of server instances constituting a server instance farm operating within a datacenter for deployment, each server instance in the deployment group having access to a processor and a memory to perform the method, wherein the method comprises:
executing via the processor and the memory of each server instance a code deployment agent to load a provisioning script specifying one or more application upgrades to the respective server instance;
wherein the loading the provisioning script specifying the one or more application upgrades to the respective server instance comprises:
accessing a list specifying a location for each server instance to be provisioned with the provisioning script;
retrieving, by the code deployment agent executing at each server instance, a plurality of unique references specifying a respective repository from which to load the one or more application upgrades and one or more dependencies for each of the one or more application upgrades to the respective server instance, the plurality of unique references comprising a plurality of Uniform Resource Locators (URLs) associated with the respective repositories;
loading, by the code deployment agent executing at each server instance, the one or more application upgrades and one or more dependencies from the respective repository as specified by the plurality of unique references, into the memory of the server instance; and
executing one or more applications containing the one or more application upgrades from the memory of the server instance.

2. The method of claim 1, wherein the provisioning script further specifies a plurality of URL references.

3. The method of claim 1, wherein the server instances are tagged for identification during deployment.

4. The method of claim 1, wherein configuration of code deployments to server instances are automated via a pre-installed agent provisioning script.

5. The method of claim 1, wherein the server instances obtain permission to participate in deployment.

6. The method of claim 1, wherein the code deployment agent is installed and executed on the server instances via the provisioning script.

7. The method of claim 1, wherein the code deployment agent is configured to be installed and reinstalled via a command.

8. The method of claim 1, wherein the plurality of unique references specify one or more of the following characteristics of the application upgrades: (i) name; (ii) file type; (iii) version identifier; (iv) electronic tag; (v) commit ID; (vi) assigned user name; and (vii) assigned group name.

9. The method of claim 1, wherein the loading the one or more application upgrades from the respective repository as specified by the plurality of unique references, into the memory of the server instance comprises:
allocating a respective memory space for each of the one or more application upgrades within the memory of the server instance; and
uniquely associating a dynamically generated class loader for each of the one or more application upgrades within the respective memory space allocated to each of the one or more application upgrades.

10. The method of claim 1, wherein the deployment group of server instances constitute a server instance farm operating within a datacenter.

11. Non-transitory computer readable storage media having instructions stored thereon that, when executed by a server instance having access to a processor and memory, cause the server instance to perform operations comprising:
executing via the processor and the memory of each server instance a code deployment agent to load a provisioning script specifying one or more application upgrades to the respective server instance;
wherein the loading the provisioning script specifying the one or more application upgrades to the respective server instance comprises:
accessing a list specifying a location for the server instance to be provisioned with the provisioning script;
retrieving, by the code deployment agent executing at the server instance, a plurality of unique references specifying a respective repository from which to load the one or more application upgrades and one or more dependencies for each of the one or more application upgrades to the server instance, the plurality of unique references comprising a plurality of Uniform Resource Locators (URLs) associated with the respective repositories;
loading, by the code deployment agent executing at the server instance, the one or more application upgrades and one or more dependencies from the respective repository as specified by the plurality of unique references, into the memory of the server instance; and
executing one or more applications containing the one or more application upgrades from the memory of the server instance.

12. The non-transitory computer readable storage media of claim 11, wherein the server instance is tagged for identification during deployment.

13. The non-transitory computer readable storage media of claim 11, wherein configuration of code deployments to the server instance is automated via a pre-installed agent provisioning script.

14. The non-transitory computer readable storage media of claim 11, wherein the server instance obtains permission to participate in deployment.

15. The non-transitory computer readable storage media of claim 11, wherein the code deployment agent is installed and executed on the server instance via the provisioning script.

16. A computing server instance configured to provision one or more application upgrades, wherein the computing server instance comprises:
- a memory to store instructions;
- a processor to execute the instructions stored in the memory;
- wherein the instructions, when executed by the processor of the computing server instance, instantiate a code deployment agent to execute via the processor and the memory of the computing server instance to:
  - accessing a list specifying a location for the computing server instance to be provisioned with a provisioning script;
  - retrieving, by the code deployment agent executing at the computing server instance, a plurality of unique references specifying a respective repository from which to load the one or more application upgrades and one or more dependencies for each of the one or more application upgrades to the computing server instance, the plurality of unique references comprising a plurality of Uniform Resource Locators (URLs) associated with the respective repositories;
  - loading, by the code deployment agent executing at the computing server instance, the one or more application upgrades and one or more dependencies from the respective repository as specified by the plurality of unique references, into the memory of the computing server instance; and
  - executing one or more applications containing the one or more application upgrades from the memory of the computing server instance.

17. The computing server instance of claim 16, wherein the computing server instance is tagged for identification during deployment.

18. The computing server instance of claim 16, wherein the server instance obtains permission to participate in deployment.

19. The computing server instance of claim 16, wherein the code deployment agent is installed and executed on the server instance via the provisioning script.

20. The computing server instance of claim 16, wherein the plurality of unique references specify one or more of the following characteristics of the application upgrades: (i) name; (ii) file type; (iii) version identifier; (iv) electronic tag; (v) commit ID; (vi) assigned user name; and (vii) assigned group name.

* * * * *